US006915513B2

(12) United States Patent
Duesterwald et al.

(10) Patent No.: US 6,915,513 B2
(45) Date of Patent: Jul. 5, 2005

(54) SYSTEM AND METHOD FOR DYNAMICALLY REPLACING CODE

(75) Inventors: Evelyn Duesterwald, Somerville, MA (US); Stefan M. Freudenberger, Brookline, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 09/997,062

(22) Filed: Nov. 29, 2001

(65) Prior Publication Data

US 2003/0101431 A1 May 29, 2003

(51) Int. Cl.[7] .................................................. G06F 9/44
(52) U.S. Cl. ........................ 717/168; 717/169; 717/172
(58) Field of Search ................................ 717/168, 169, 717/172, 173

(56) References Cited

U.S. PATENT DOCUMENTS

| 5,339,430 | A | * | 8/1994 | Lundin et al. ............... 719/332 |
|---|---|---|---|---|
| 5,555,416 | A | * | 9/1996 | Owens et al. ................ 717/178 |
| 5,625,804 | A | * | 4/1997 | Cooper et al. ................. 703/26 |
| 5,664,195 | A | * | 9/1997 | Chatterji ...................... 717/178 |
| 5,768,593 | A | | 6/1998 | Walters et al. |
| 5,832,275 | A | * | 11/1998 | Olds ........................... 717/173 |
| 5,832,519 | A | * | 11/1998 | Bowen et al. ............... 707/203 |
| 5,860,104 | A | * | 1/1999 | Witt et al. ................... 711/137 |
| 5,974,549 | A | | 10/1999 | Golan |
| 6,006,033 | A | * | 12/1999 | Heisch ........................ 717/158 |
| 6,006,034 | A | * | 12/1999 | Heath et al. ................. 717/170 |
| 6,009,274 | A | * | 12/1999 | Fletcher et al. ............. 717/173 |
| 6,023,704 | A | * | 2/2000 | Gerard et al. ........... 707/103 R |
| 6,049,672 | A | * | 4/2000 | Shiell et al. ................. 717/168 |
| 6,052,531 | A | * | 4/2000 | Waldin et al. ............... 717/170 |
| 6,154,878 | A | * | 11/2000 | Saboff ......................... 717/173 |
| 6,185,734 | B1 | * | 2/2001 | Saboff et al. ................ 717/164 |

(Continued)

FOREIGN PATENT DOCUMENTS

EP 0665496 A1 8/1995

OTHER PUBLICATIONS

Kim et al, Hardware support for control transfers in code caches, IEEE Micro, pp 1–12, 2003.*
Calder et al, Fast and accurate instruction fetch and branch prediction, IEEE, pp 2–11, 1994.*
Yamada et al, Data relocation and prefetching for programs with large data sets, ACM Micro, pp 118–127, Nov. 1994.*
Yeh et al, A comprehensiv instruction fetch mechanism for a processor supporting speculative execuation, IEEE, pp 129–139.*
Application entitled "System and Method for Facilitating Profiling and Application" by Fisher, et al.; U.S. Appl. No. 10/606,867; filed Jun. 26, 2003.
Hicks, et al.; "Dynamic Software Updating"; Jun. 2001.
Segal, et al.; "On–The–Fly Program Modification: Systems for Dynamic Updating"; IEEE Computer Society, vol. 10, No. 2; Mar. 1993; pp. 53–65.

*Primary Examiner*—Anil Khatri

(57) ABSTRACT

The present disclosure relates to a system and method for dynamically replacing code. In one arrangement, the system and method pertain to intercepting original program instructions during execution of the program, determining if an original program instruction is to be replaced, and dynamically replacing the program instruction with a replacement instruction if it is determined that the original program instruction is to be replaced.

18 Claims, 5 Drawing Sheets

U.S. PATENT DOCUMENTS

| | | | |
|---|---|---|---|
| 6,199,203 B1 * | 3/2001 | Saboff | 717/168 |
| 6,199,204 B1 * | 3/2001 | Donohue | 717/178 |
| 6,202,207 B1 * | 3/2001 | Donohue | 717/173 |
| 6,275,938 B1 | 8/2001 | Bond et al. | |
| 6,321,380 B1 * | 11/2001 | Derrick et al. | 717/168 |
| 6,367,072 B1 * | 4/2002 | Justice et al. | 717/168 |
| 6,385,770 B1 * | 5/2002 | Sinander | 717/170 |
| 6,499,123 B1 * | 12/2002 | McFarland et al. | 714/724 |
| 6,651,249 B2 * | 11/2003 | Waldin et al. | 717/170 |
| 6,721,875 B1 * | 4/2004 | McCormick et al. | 712/233 |
| 6,823,445 B2 * | 11/2004 | May et al. | 712/226 |
| 2003/0093650 A1 | 5/2003 | Desoli | |
| 2003/0101292 A1 | 5/2003 | Fisher et al. | |
| 2003/0101330 A1 | 5/2003 | Duesterwald et al. | |
| 2003/0101334 A1 | 5/2003 | Desoli | |
| 2003/0101381 A1 | 5/2003 | Mateev et al. | |
| 2003/0101439 A1 | 5/2003 | Desoli et al. | |
| 2003/0182653 A1 | 9/2003 | Desoli et al. | |
| 2003/0192035 A1 | 10/2003 | Duesterwald ald | |
| 2004/0025165 A1 | 2/2004 | Desoli et al. | |

* cited by examiner

SYSTEM AND METHOD FOR DYNAMICALLY REPLACING CODE

FIELD OF THE INVENTION

This disclosure generally relates to dynamic transformation of executing binary program code. More particularly, the disclosure relates to a system and method for dynamically replacing application code.

BACKGROUND OF THE INVENTION

Often, it is desirable to modify software applications. For instance, where the software application is faulty in some way, i.e., contains one or more "bugs" that interfere with the intended operation of the application, it is desirable to modify the application code to repair the application. Normally, application code may be modified with a software patch that comprises replacement code that is used to replace the original code. Although it is not necessarily difficult to patch software in the manner described above, such patching is static. Specifically, the software patch must be developed off-line and installed while the application is not running. This can create problems where the application is one that must run continuously, e.g., network server applications, financial transaction applications, telephone switching applications, airline reservation and air traffic control system applications, etc. When it comes to such applications, the user must be able to upgrade the software to fix bugs, improve performance, expand functionality, and so forth. In the simplest case, upgrades and bug fixes require the system to be shut down, updated, and then brought back on-line. This, of course, is not acceptable for non-stop applications and, at best, will result in loss of service and revenue.

At present, there are several solutions to the problem of updating code of a non-stop application. One approach is to provide application-specific software support in conjunction with redundant hardware (already present to support fault tolerance) to enable so-called hot standbys. Clearly, this approach is expensive and, perhaps worse, adds to the complexity of building applications. Much of the complexity comes from the need for the standby machine(s) to keep or gain the state maintained by the running application. Less sophisticated users may not have the resources necessary for such a solution and seek simpler, more general, solutions.

Although dynamic updating methods have been suggested that do not require redundant hardware, no prior general-purpose methodology achieves a practical balance between flexibility, robustness, low overhead, and ease of use. For example, while dynamic linking may facilitate the addition of new code to a running program, it cannot be used to replace existing bindings with new ones. In addition, those systems that do allow replacement typically either limit what can be updated or how the updates may occur. These limitations leave open the possibility that a software update may be needed yet cannot be accomplished without downtime. Furthermore, there are few safeguards to ensure update correctness. Some systems, for example, require potentially error-prone hand-generation of complex patch files. Others rely on uncommon source languages or properties and hence are not broadly applicable. Furthermore, some systems impose a high overhead, either due to implementation complexities or due to a reliance on interpreted code.

From the foregoing, it can be appreciated that it would be desirable to have a system and method for dynamically replacing application code without interrupting application operation.

SUMMARY

In another arrangement, the system and method pertain to gaining control over the execution of a program, intercepting program instructions, determining whether the program instructions have been cached and, if so, executing the cached instructions, if the program instructions have not been cached, determining if the program instructions are to be replaced, and dynamically replacing the program instructions with replacement instructions if it is determined that the program instructions are to be replaced.

BRIEF DESCRIPTION OF THE DRAWINGS

The invention can be better understood with reference to the following drawings.

DETAILED DESCRIPTION

As is explained below, such a system and method can be used to, for instance, replace faulty or otherwise undesired code. Generally speaking, the disclosed system and method can be used to gain control of software to be executed such that each unwanted portion of code can be dynamically patched.

To facilitate description of the inventive system and method, example systems are discussed with reference to the figures. Although these systems are described in detail, it will be appreciated that they are provided for purposes of illustration only and that various modifications are feasible without departing from the inventive concept. Other example systems are described in U.S. patent application Ser. No. 09/924,260, filed Aug. 8, 2001, entitled "Dynamic Execution Layer Interface for Explicitly or Transparently Executing Application or System Binaries" (attorney docket no. 10011525-1), which is hereby incorporated by reference into the present disclosure. After the description of the example systems, examples of operation of the systems are provided to explain the manners in which dynamic code patching can be provided.

Figure 1:
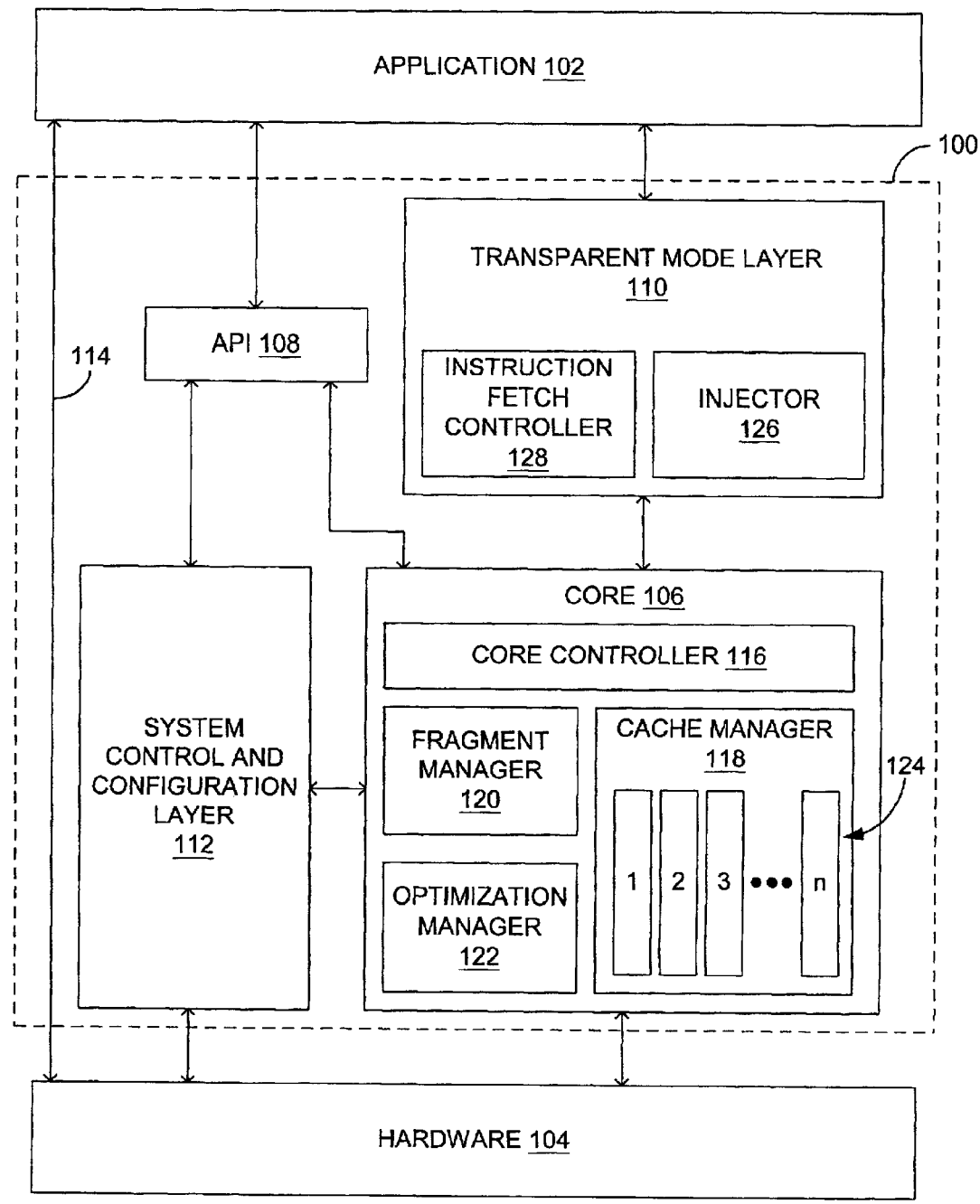
FIG. 1 is a block diagram illustrating an example of a dynamic execution layer interface (DELI) executing on a computer system to provide dynamic transformation services to applications and operating systems.

Referring now to FIG. 1, illustrated is an example dynamic execution layer interface (DELI) 100. Generally speaking, the DELI 100 comprises a generic software layer written in a high or low level language that resides between applications, including or not including an operating system (O/S), and hardware to untie application binary code from the hardware. Through this arrangement, the DELI 100 can provide dynamic computer program code transformation, caching, and linking services which can be used in a wide variety of different applications such as emulation, dynamic translation and optimization, transparent remote code execution, remapping of computer system functionality for virtualized hardware environments program, code decompression, code decrypting, etc. As is discussed in greater detail below, the DELI 100 can provide its services while operating in a transparent mode, a nontransparent mode, or combinations of the two. In the transparent mode, the DELI 100 automatically takes control of an executing program in a manner in which the executing program is unaware that it is not executing directly on computer hardware. In the nontransparent mode, the DELI 100 exports its services through an application programming interface (API) to the application to allow the application to control how the DELI 100 reacts to certain system events.

As depicted in FIG. 1, the DELI 100 resides between at least one application 102 and computer hardware 104. Depending upon the particular arrangement, the application 102 can comprise one or more user applications that are unaware of the DELI's presence and/or a client (e.g., emulator) that is aware of the DELI 100 and which is configured to utilize the DELI's services. More generally, however, the application 102 comprises any type of program code containing instructions to be executed by a computer processor. Where an O/S is used, the DELI 100 may reside either above or below the O/S (not indicated) depending upon the nature of the services that are provided. For example, when the DELI 100 operates above the O/S, it can only control execution of applications. If the DELI 100 operates below the O/S, however, the DELI has access to an instruction stream which can include a mix of system and user code both from the O/S and applications. The hardware 104 can comprise various different computer system components but typically at least comprises a computer processor.

The DELI 100 can include four main components including a core 106, an application programming interface (API) 108, a transparent mode layer 110, and a system control and configuration layer 112. Generally speaking, the core 106 exports two main services to both the API 108 and the transparent mode layer 110. The first of these services pertains to the caching and linking of native code fragments or code fragments which correspond to the instruction set of the hardware 104. The second pertains to executing previously cached code fragments. The API 108, where provided, exports functions to the application 102 that provide access to the caching and linking services of the core 106 in the nontransparent mode of operation. The transparent mode layer 110 enables the core 106 to gain control transparently over code execution in the transparent mode of operation as well as fetch code fragments to be cached. Finally, the system control and configuration layer 112 enables configuration of the DELI 100 by providing policies for operation of the core 106 including, for example, policies for the caching, linking, and optimizing of code. These policies can, for example, be provided to the layer 112 from the application 102 via the API 108. The system control and configuration layer 112 also controls whether the transparent mode of the DELI 100 is enabled, thus determining whether the core 106 receives input from the API 108, the transparent mode layer 110, or both.

As is further indicated in FIG. 1, the system 100 can include a bypass path 114 that can be used by the application 102 to bypass the DELI 100 so that the application can execute directly on the hardware 104, where desired. It is noted that such operation can be possible in that the DELI 100 is an optional execution layer which may or may not be utilized.

As is shown in FIG. 1, the core 106 comprises a core controller 116, a cache manager 118, a fragment manager 120, and an optimization manager 122. The core controller 116 functions as a dispatcher that assigns tasks to the other components of the core 106 that are responsible for completing the tasks. The cache manager 118 comprises a mechanism (e.g., set of algorithms) that controls the caching of the code fragments within one or more code caches 124 (e.g., caches 1 through n) according to the policies specified by the system control and configuration layer 112 as well as the fragment manager 120 and the optimization manager 122. The one or more code caches 124 of the core 106 can, for instance, be located in hardware caches on one or more processors of the hardware 104, or can be created in the main local memory of the hardware. Where the code cache(s) 124 is/are mapped in hardware caches onboard the processor(s), greatly increased performance can be obtained due to reduced instruction cache refill overhead, increased memory bandwidth, etc. The fragment manager 120 specifies the arrangement of the code fragments within the code cache(s) 124 and the type of transformation that is imposed upon the fragments. Finally the optimization manager 122 contains the set of optimizations that can be applied to the code fragments to optimize their execution.

As noted above, the API 108, where provided, exports functions to the application 102 that provide access to DELI services. More specifically, the API 108 exports caching and linking services of the core 106 to the application 102, which typically comprises a client that is aware of the DELI's presence. These services exported by the API 108 enable the application 102 to control the operation of the DELI 100 in the nontransparent mode by (i) explicitly emitting code fragments to the core 106 for caching and/or by (ii) instructing the DELI 100 to execute specific code fragments out of its code cache(s) 124. In addition, the API 108 also can export functions that initialize and discontinue operation of the DELI 100. For instance, the API 108 can initiate transparent operation of the DELI 100 and further indicate when the DELI is to cease such operation. The API 108 also, as mentioned above, facilitates configuration of the DELI 100 by delivering policies specified by the application 102 to the core 106 (e.g., to the fragment manager 120 and/or the optimization manager 122).

It is to be noted that, although the DELI 100 has been shown and described herein as including the API 108, persons having ordinary skill in the art will appreciate from this disclosure taken as a whole that the API may be omitted altogether depending upon the mode of operation that is desired. For instance, where the DELI 100 is to only operate in a completely transparent mode, the API 108 may not be necessary.

With further reference to FIG. 1, the transparent mode layer 110 typically includes an injector 126 which is used to gain control over a running application 102 transparently. When the DELI 100 operates in a completely transparent mode (i.e., where the application is unaware of the DELI's presence) the injector 126 is used to inject the DELI into the application 102 before the application begins execution so that the application can be run under DELI control. In such circumstances, the DELI 100 avoids modifying the application's 102 executable image to avoid impeding exception handling. Control can be gained by the injector 126 in several different ways, each of which loads the application binaries without changing the virtual address at which the binaries are loaded. By way of example, the O/S kernel loader can be modified such that the DELI 100 (e.g., compiled as a shared library) is automatically loaded by the kernel loader when it loads the application's executable image. Alternatively, a user level loader can be used to leverage the kernel loader without modifying it to load the application 102 in memory in suspended mode and later inject instructions into the application (e.g., on the application stack) that will load the DELI 100 shared library later when the application is resumed.

In another alternative, ptrace can be used to attach the DELI 100 to the application 102. As is known in the art, ptrace is a mechanism often used by debuggers that allows one process to control another. The DELI 100 can be configured as a separate process that attaches to the application 102 viaptrace, and runs the application until the point where the execution start-up code at the top of the application's binary image (e.g., crt0) is about to call the application's entry point. Execution of the application 102 can then be suspended, and the DELI 100 can be used to fetch the application instructions and execute them on its behalf.

In yet another alternative, the application's text segment can be expanded in a separate copy of the executable file. In particular, the application's binary image can be copied to a temporary location, the application's text segment extended by adding a DELI text segment at the end, and the start symbol (i.e., the entry point that is called by crt0) changed to the DELI entry point. The resulting executable file can then be executed using exec. The original application's text segment is still loaded at the same virtual address that it would normally have, but the DELI 100 will gain control before the actual application 102 starts.

In another example, the DELI 100 can gain control over the application 102 using a special version of crt0. As is known in the art, the crt0 code is responsible for picking-up the command line arguments, setting up the initial stack and data segment, and then making a call to the value of the start symbol (usually the main( ) function of the application 102). Prior to calling the application 102 entry point, crt0 maps the dynamic link loader did, which then loads any dynamically linked libraries (DLLs) referenced by the application 102. A custom version of crt0 can be used to additionally map the DELI code (itself compiled as a DLL), and call the DELI's entry point instead of the one defined by the start symbol.

Irrespective of the manner in which control is obtained over the application 102, an instruction fetch controller 128 can then be used to extract (i.e., fetch) copies of fragments (e.g., traces) of the application binary code, pass them to the DELI core 106 for caching, and direct the core 106 to execute the appropriate cached copies out of its code cache (s) 124. Use of the transparent mode layer 1110 in facilitating such operation is described below in relation to FIG. 4.

As noted above, the system control and configuration layer 112 enables configuration of the DELI 100 by providing policies for the caching and linking of code. Although the DELI 100 is not limited to any particular type of policy or policy content, the policies typically determine how the DELI will behave. For instance, the layer 112 may provide policies as to how fragments of code are extracted from the application 102, how fragments are created from the original code, how multiple code fragments can be linked together to form larger code fragments, etc. The layer's policies can be static or dynamic. In the former case, the policies can be hardcoded into the DELI 100, fixing the configuration at build time. In the latter case, the policies can be dynamically provided by the application 102 through function calls in the API 108. Implementation of the policies controls the manner in which the DELI 100 reacts to specific system and/or hardware events (e.g., exceptions and interrupts). In addition to the policies noted above, the system control and configuration layer 112 can specify the size of the code cache(s) 124, whether a log file is created, whether code fragments should be optimized, etc.

Figure 2:
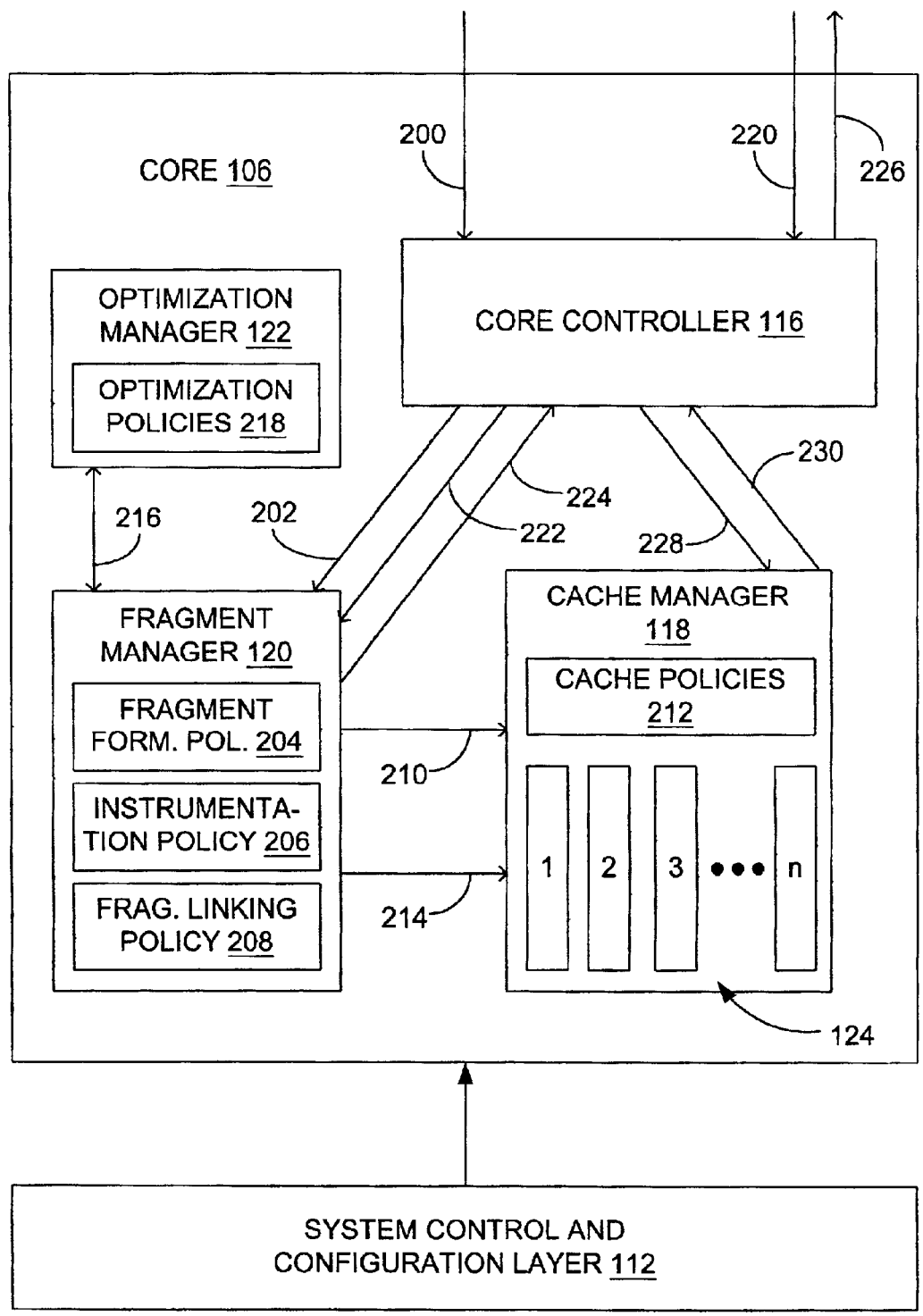
FIG. 2 is a block diagram of an example configuration and operation of a core of the DELI shown in FIG. 1.

FIG. 2 illustrates an example configuration of the core 106 and its operation. As indicated in this figure, the core 106 accepts two types of requests from the API 108 or the transparent mode layer 110. First, requests 200 can be accepted for caching and linking a code fragment through a function interface. Such a request can comprise a function in the form of, for instance, "DELI_emit_fragment(tag, fragbuf)". This function receives a code fragment as its parameters and an identifier (e.g., tag) to store in the DELI cache(s) 124. In addition, the core 106 accepts requests for initiating execution at a specific code fragment tag through a function interface such as "DELI_execute_fragment(tag)", which identifies a code fragment stored in the cache(s) 124 to pass to the hardware 104 for execution.

The core controller 116 processes these requests and dispatches them to the appropriate core module. A request 202 to emit a code fragment with a given identifier can then be passed to the fragment manager 120. The fragment manager 120 transforms the code fragment according to its fragment formation policy 204, possibly instruments the code fragment according to its instrumentation policy 206, and links the code fragment together with previously cached fragments according to its fragment linking policy 208. For example, the fragment manager 120 may link multiple code fragments in the cache(s) 124, so that execution jumps to another code fragment at the end of executing a code fragment, thereby increasing the length of execution from the cache(s). To accomplish this, the fragment manager 120 issues fragment allocation instructions 210 to the cache manager 118. The fragment manager 120 then sends a request to the cache manager 118 to allocate the processed code fragment in the code cache(s) 124.

The cache manager 118 controls the allocation of the code fragments and typically is equipped with its own cache policies 212 for managing the cache space. However, the fragment manager 120 may also issue specific fragment deallocation instructions 214 to the cache manager 118. For example, the fragment manager 120 may decide to integrate the current fragment with a previously allocated fragment, in which case the previous fragment may need to be deallocated. In some arrangements, the cache manager 118 and fragment manager 120 can manage the code cache(s) 124 and code fragments in the manner shown and described in U.S. Pat. No. 6,237,065, issued May 22, 2001, entitled "A Preemptive Replacement Strategy for a Caching Dynamic Translator Based on Changes in the Translation Rate," which is hereby incorporated by reference into the present disclosure. Alternatively, management of the code cache(s) 124 and code fragments may be performed in the manner shown and described in U.S. patent application Ser. No. 09/755,389, filed Jan. 5, 2001, entitled "A Partitioned Code Cache Organization to Exploit Program Locality," which is also hereby incorporated by reference into the present disclosure.

Prior to passing a fragment to the cache manager 118, the fragment manager 120 may pass (216) the fragment to the optimization manager 122 to improve the quality of the code fragment according to its optimization policies 218. In some arrangements, the optimization manager 122 may optimize code fragments in the manner shown and described in U.S. patent application Ser. No. 09/755,381, filed Jan. 5, 2001, entitled "A Fast Runtime Scheme for Removing Dead Code Across Linked Fragments", which is hereby incorporated by reference into the present disclosure. Alternatively, the optimization manager 122 may optimize code fragments in the manner shown and described in U.S. patent application Ser. No. 09/755,774, filed Jan. 5, 2001, entitled "A Memory Disambiguation Scheme for Partially Redundant Load Removal", which is also hereby incorporated by reference into the present disclosure. Notably, the optimization manager 122 may also optimize code fragments using classical compiler optimization techniques, such as elimination of redundant computations, elimination of redundant memory accesses, inlining functions to remove procedure call/return overhead, etc.

As mentioned above, the fragment manager 120 transforms the code fragment according to its fragment formation policy 204. The transformations performed by the fragment manager 120 can include code relocation by, for instance, changing memory address references by modifying relative addresses, branch addresses, etc. The layout of code fragments may also be modified, changing the physical layout of the code without changing its functionality (i.e., semantics). These transformations are performed by the fragment manager 120 on fragments received through the API 108 and from the instruction fetch controller 128.

To perform code instrumentation, the fragment manager 120 gathers data according to the instrumentation policy 206 for code profiling, such as data on the frequency of execution of code fragments, the frequency with which a memory address is accessed, etc. Program counters can be used to collect these statistics in order to facilitate fragment formation or deallocation. These policies are configured by the system control and configuration layer 112, which receives policy instructions sent either through the API 108 or established at DELI build time. The policies may comprise options for different ways to create, instrument, optimize, and link fragments, or the policies may simply be hardcoded algorithms in the DELI 100 for performing these tasks.

The second type of request accepted by the DELI core 106 is a request 220 to execute a fragment identified by a given identifier (e.g., tag). In such a case, the core controller 116 issues a lookup request 222 to the fragment manager 120, which returns a corresponding code cache address 224 if the fragment is currently resident and active in the cache(s) 124. By way of example, the fragment manager 120 can maintain a table of resident and active code fragments in which a tag can be used to identify the location of a code fragment. Alternatively, the fragment manager 120 or cache manager 118 can use any other suitable technique for tracking whether code fragments are resident and active. If the fragment is not currently resident and active in the cache(s) 124, the fragment manager 120 returns an error code to the core controller 116, which returns (226) the fragment tag back to the initial requester as a cache miss address. If, on the other hand, the fragment is currently resident and active, the core controller 116 then patches (228) the initial request to the cache manager 118 along with its cache address. The cache manager 118, in turn, transfers control to the addressed code fragment in its code cache(s) 124, thus executing the addressed code fragment. Execution then remains focused in the code cache(s) 124 until a cache miss occurs, i.e., until a copy for the next application address to be executed is not currently resident in the cache(s). This condition can be detected, for instance, by an attempt of the code being executed to escape from the code chache(s) 124. A cache miss is reported (230) from the cache manager 118 to the core controller 116 and, in turn, back (226) to the initial requester.

Figure 3:
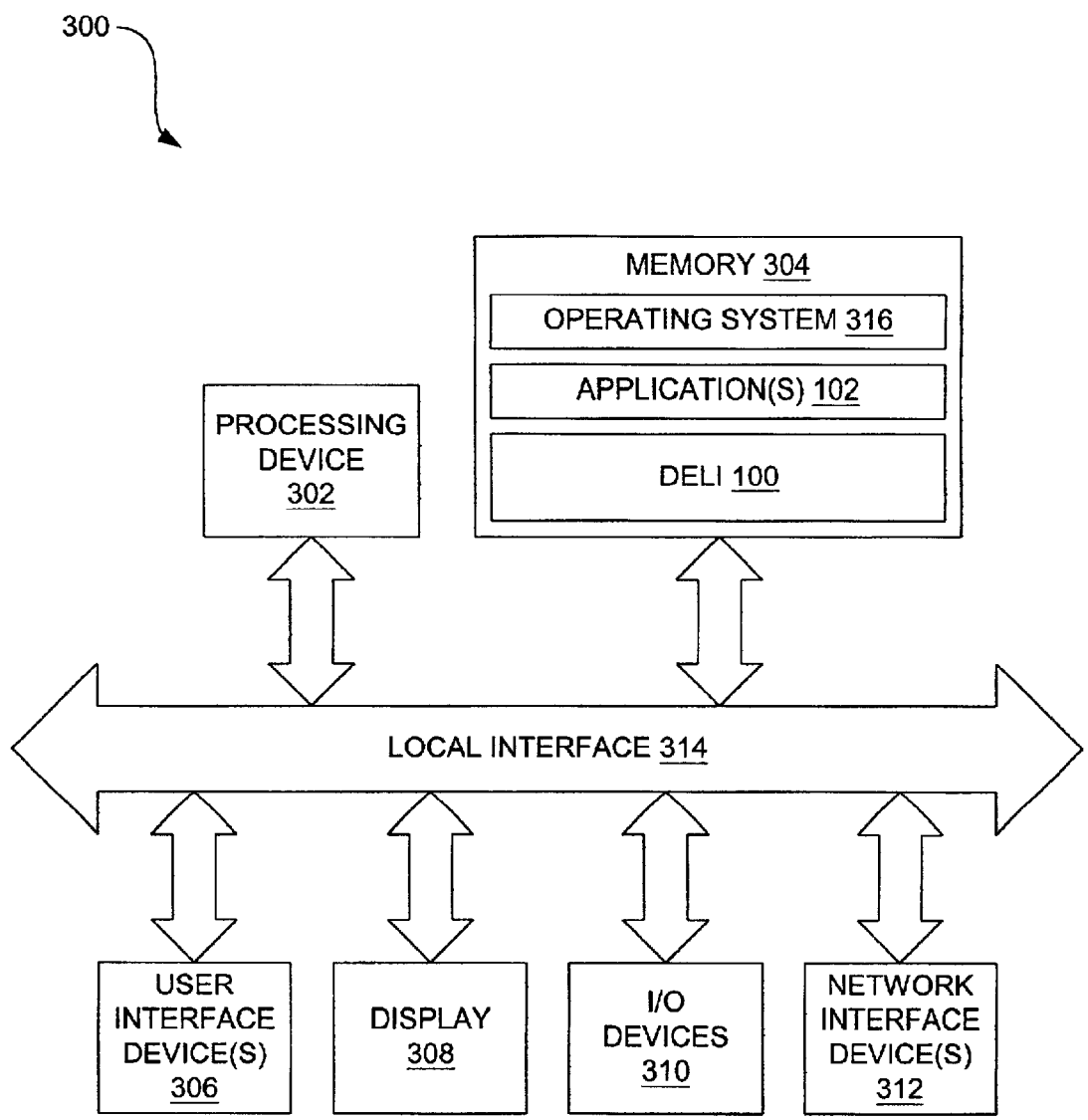
FIG. 3 is a block diagram of an example computer system on which the DELI shown in FIG. 1 can be executed.

FIG. 3 is a schematic view illustrating an example architecture for a computer system 300 on which the DELI 100 can execute. Generally speaking, the computer system 300 can comprise any one of a wide variety of wired and/or wireless computing devices, such as a desktop computer, portable computer, dedicated server computer, multi-processor computing device, cellular telephone, personal digital assistant (PDA), handheld or pen-based computer, and so forth. Irrespective its specific arrangement, the computer system 300 can, for instance, comprise a processing device 302, memory 304, one or more user interface devices 306, a display 308, one or more input/output (I/O) devices 310, and one or more networking devices 312, each of which is connected to a local interface 314.

The processing device 302 can include any custom made or commercially available processor, a central processing unit (CPU) or an auxiliary processor among several processors associated with the computer system 300, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 304 can include any one of a combination of volatile memory elements (e.g., random access memory (RAM, such as DRAM, SRAM, etc.)) and nonvolatile memory elements (e.g., ROM, hard drive, tape, CDROM, etc.). The memory 304 typically comprises an O/S 316, one or more applications 102 (e.g., user application and/or client), and the DELI 100, which has already been described in detail. Persons having ordinary skill in the art will appreciate that the memory 304 can, and typically will, comprise other components which have been omitted for purposes of brevity.

The one or more user interface devices 306 comprise those components with which the user can interact with the computing system 300. For example, where the computing system 300 comprises a personal computer (PC), these components can comprise a keyboard and mouse. Where the computing system 300 comprises a handheld device (e.g., PDA, mobile telephone), these components can comprise function keys or buttons, a touch-sensitive screen, a stylus, etc. The display 308 can comprise a computer monitor or plasma screen for a PC or a liquid crystal display (LCD) for a handheld device.

With further reference to FIG. 3, the one or more I/O devices 310 are adapted to facilitate connection of the computing system 300 to another system and/or device and may therefore include one or more serial, parallel, small computer system interface (SCSI), universal serial bus (USB), IEEE 1394 (e.g., Firewire™), and/or personal area network (PAN) components. The network interface devices 312 comprise the various components used to transmit and/or receive data over a network. By way of example, the network interface devices 312 include a device that can communicate both inputs and outputs, for instance, a modulator/demodulator (e.g., modem), wireless (e.g., radio frequency (RF)) transceiver, a telephonic interface, a bridge, a router, network card, etc.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The general nature of the DELI 100 having been described above, an example of operation of the DELI will now be discussed with reference to FIG. 4 which illustrates the transparent mode of operation. In describing operation in this mode, a flow diagram is provided. It is to be understood that any process steps or blocks in the flow diagram represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Generally speaking, irrespective of whether the DELI 100 has gained control over the execution of the application 102 transparently or nontransparently, the application does not execute directly on the hardware 104. Rather, application code executes through the DELI 100, for instance, in the form of code fragments that may be maintained in the code cache(s) 124. FIG. 4 illustrates a simple example of DELI operation in the transparent mode. More particularly, FIG. 4 illustrates DELI operation in a completely transparent mode in which the application 102 is unaware of the DELI's presence. Beginning with block 400, the DELI 100 is first initiated. When operating in the transparent mode, this initiation can result from initiation of the application 102. Upon its initiation, the DELI 100 is injected into the application 102 with the injector 126 of the transparent mode layer 110, as indicated in block 402, such that the DELI gains control over the application and its execution. As noted above, there are various different methods in which this control can be gained.

Once the DELI 100 has control over the application 102, the DELI can be used to provide any one of several different services such as those noted above. For instance, the DELI 100 can facilitate hardware and/or software emulation, dynamic translation and optimization, transparent remote code execution, remapping of computer system functionality for virtualized hardware environments program, code decompression, code decryption, etc. These different services each involve the caching and the linking of program code fragments within the code cache(s) 124. By caching certain fragments of code copied from the application binaries and transforming them in some manner, the desired services can be provided by later executing the transformed code from the code cache(s) 124.

Before caching code, the DELI 100 must determine which particular fragments of code to cache. In that, when operating in the completely transparent mode, the application 102 is unaware of the DELI 100, the DELI does not receive guidance from the application as to which code fragments to cache. Although the caching of code can be dictated through the policies created at the DELI build time, more preferably, the DELI 100 has the capability to, at least in part, make these determinations on its own. The DELI 100 can do this by monitoring the execution of code by the application 102, as indicated in block 404. In so doing, the DELI 100 can collect information as to, for instance, which code fragments are most useful to the application 102 by, for example, determining which fragments are most frequently used.

As the various code fragments are executed by the application 102 under the control of the DELI 100, the DELI "sees" each piece of code that is executed. Through the monitoring process, the DELI 100 can, therefore, determine which code fragments are used most frequently. The DELI 100 can then make the determination of which pieces of code are "hot," i.e., most important to application execution with reference to the policies that are provided by the system control and configuration layer 112. As noted above, this determination can be made using program counters that track execution instances. Persons having ordinary skill in the art will appreciate that various other methods can be used to make the determination of which pieces of code are hot. Examples of the manner in which this determination can be made are described in U.S. patent application Ser. No. 09/186,945, filed Nov. 5, 1998, entitled "Method for Selecting Active Code Traces for Translation in a Caching Dynamic Translator," and U.S. patent application Ser. No. 09/312,296, filed May 14, 1999, entitled "Low Overhead Speculative Selection of Hot Traces in a Caching Dynamic Translator," both of which are hereby incorporated by reference into the present disclosure.

Figure 4:
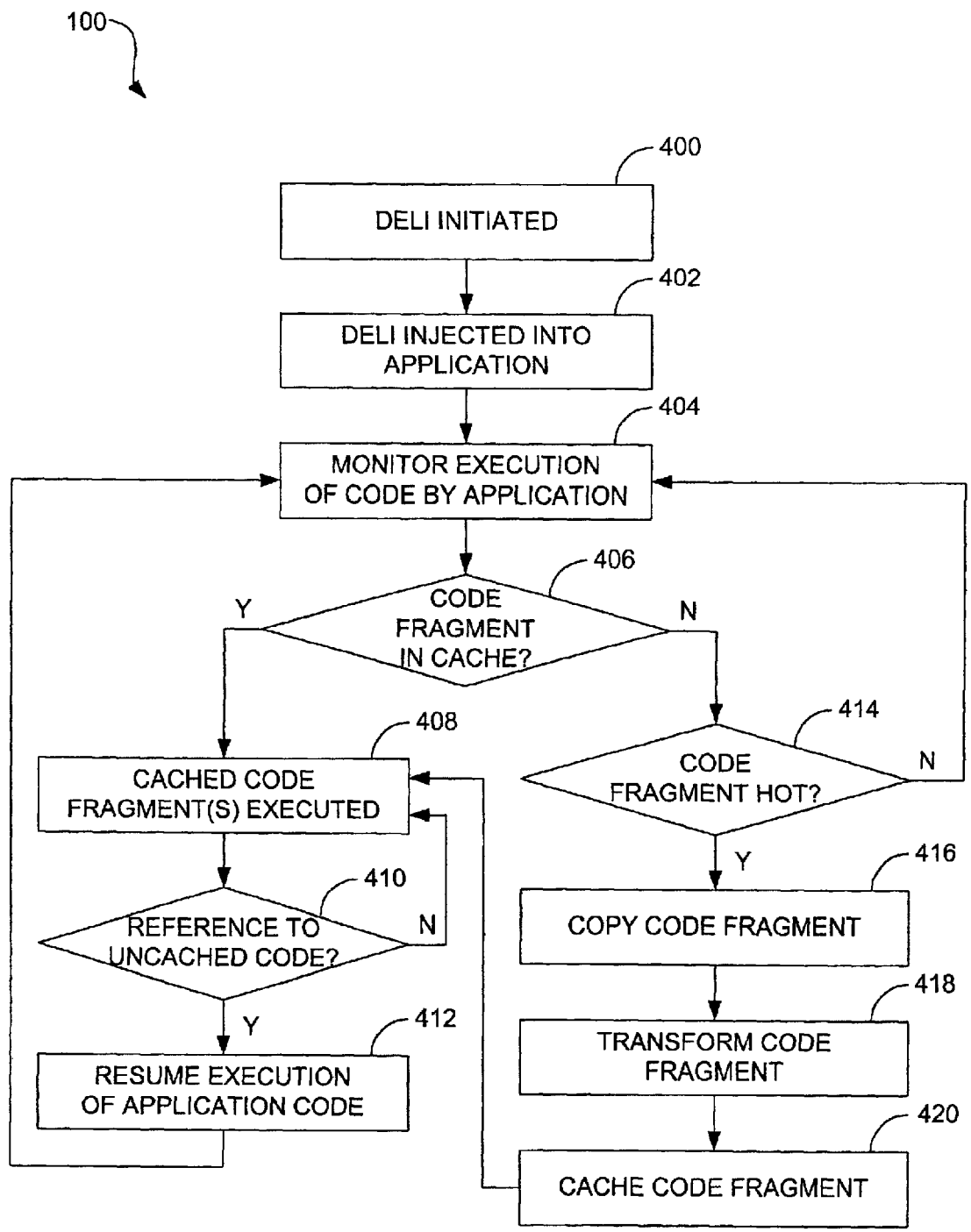
FIG. 4 is a flow diagram that illustrates an example of the DELI shown in FIG. 1 operating in a transparent mode.

With further reference to FIG. 4, as each code fragment is executed, the DELI 100 can determine whether an associated code fragment has previously been cached, as indicated in decision element 406. If so, the DELI 100 jumps to the code cache(s) 124 that contains the cached (and potentially transformed) code and this code is executed by the hardware 104 in lieu of the original application code, as indicated in block 408. The determination of whether the code has been cached can be made with reference to, as noted above, identifiers (e.g., tags) that identify the association between native application code and analogues that have been cached within the code cache(s) 124. Execution of the cached code then continues, including the execution of linked fragments of code that reside in the code cache(s) 124, until such time when a reference to code that has not been cached (i.e., a cache miss) is encountered. With reference to decision element 410, if a reference to uncached code is encountered, the DELI 100 jumps back to the application code and the execution of that code is resumed, as indicated in block 412. At this time, the DELI 100 can resume monitoring of this execution (block 404).

Returning to decision element 406, if the DELI 100 determines that an associated code fragment does not reside in the code cache(s) 124, flow continues to decision element 414 at which it is determined whether the code fragment is hot with reference to a predetermined policy. If the code is not hot, flow returns to block 404 at which monitoring of the application code execution continues. If, on the other hand, the code is hot, the code fragment is copied, as indicated in block 416, by fetching the fragment using the instruction fetch controller 128 of the transparent mode layer 110. It is noted that, if desired, each piece of code can be copied prior to determining whether the code is hot in decision element 414. Such a change does not, however, affect the overall operation of the system 100 or the results that can be achieved.

At this point, the code fragment can be transformed in some manner, as indicated in block 418. In addition, code fragments within the cache(s) 124 can be linked according to the policies that have been established for code linking. The nature of the code transformation depends upon the type of services that the DELI 100 is to provide. For example, where the DELI 100 is to merely optimize the application execution, this transformation can comprise rearranging and/or reconfiguring the code for better performance. Irrespective of the nature of the transformation provided, the code structure is modified in a way without modifying the underlying semantics. Once the code fragment has been transformed, the transformed code can be cached within the code cache(s) 124, as indicated in block 420, and executed within the DELI 100 with flow continuing to block 408 described above.

As noted above, the DELI 100 may also operate in a nontransparent mode. Generally speaking, when operating in the nontransparent mode, the DELI 100 may operate, for example, as a DLL or a statically linked module which exports functions in the API 108 that the application 102 can access. In the simplest case, the application (client) controls every aspect of DELI operation through the API 108. In such a case, the DELI 100 can be utilized to cache, link, and optimize code according to explicit instructions provided by the client via the API 108. Alternatively, the client may call upon the DELI 100 to provide its services in a transparent manner. In such a case, the client invokes operation of the DELI 100, as well as provides instructions as to when the DELI is to halt its operation. In either case, the client is aware of the DELI 100 and is configured to utilize the DELI's services. In the typical patching scenario, however, the application software is not written with knowledge of the DELI 100. Therefore, the nontransparent mode typically is not used when patching code and will not be discussed in detail. Persons having ordinary skill in the art will appreciate, however, that patching could be provided in a nontransparent manner where the application software is written to facilitate such patching, e.g., with the inclusion of several hooks that can be identified to the DELI 100 to permit code fragment replacement.

As described above, there are several problems associated with patching (e.g., debugging) code of non-stop applications. Such problems can be avoided, however, when the DELI 100 is used to dynamically patch code fragments. As will be understood from the discussion that follows, such dynamic patching is possible in that the DELI 100 controls very small portions of code, and even individual instructions. In operation, the DELI 100 can be used to copy code fragments from an application 102 and determine which are to be replaced for some reason (e.g., that are faulty in a debugging scenario). When such code fragments are "detected," the DELI 100 can dynamically replace them with new code fragments so as to provide the desired function. The new code fragments can be cached such that, next time the original code fragments are required, the new code fragment(s) can be executed within the code cache(s) 124 to provide the new desired function. Notably, where many code fragments are copied to the code cache(s) 124, substantially all execution may ultimately occur within the code cache(s).

Figure 5:
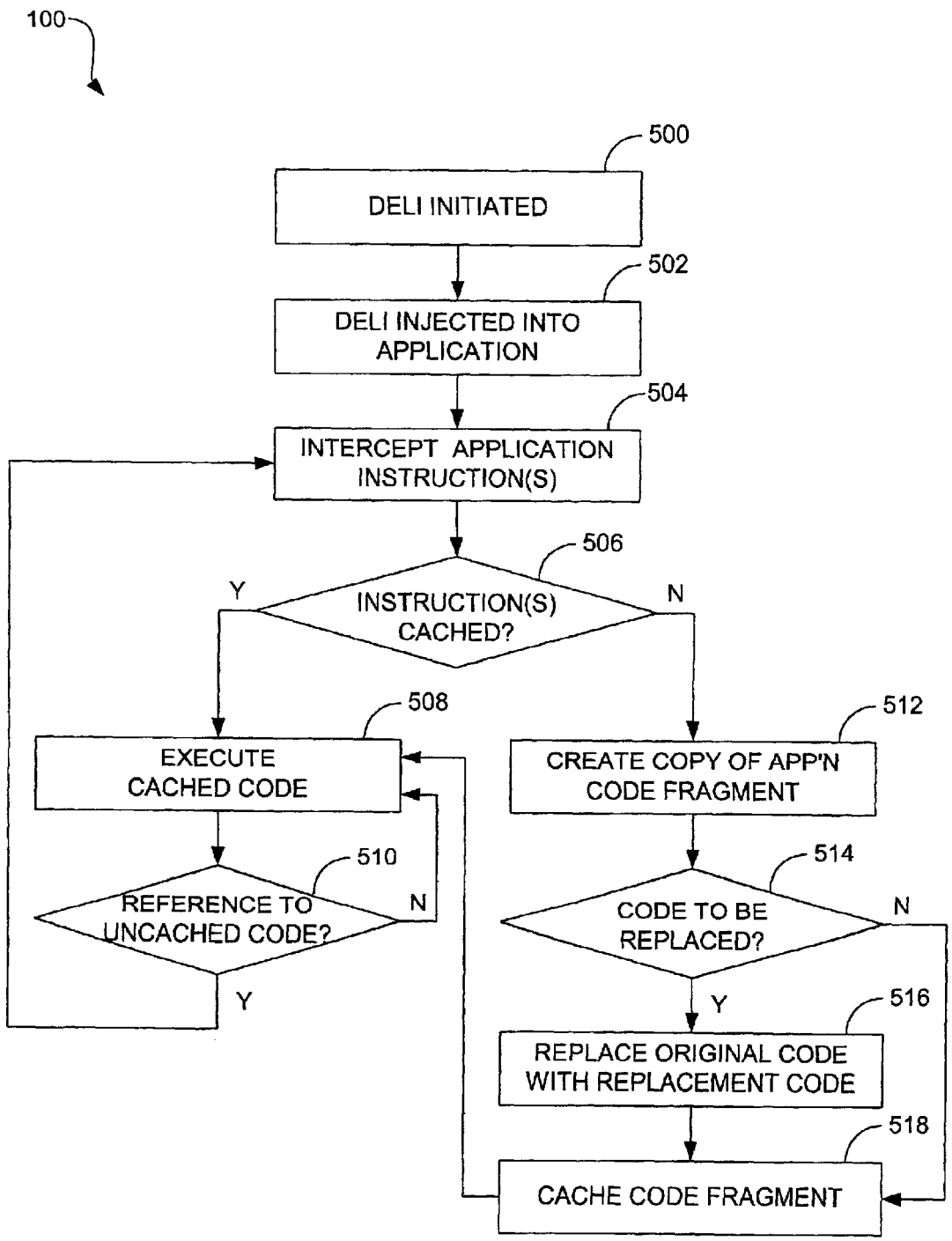
FIG. 5 is a flow diagram that illustrates an example of the DELI shown in FIG. 1 operating to provide dynamic replacement and execution of code.

An example of operation of the DELI 100 in providing dynamic code patching (i.e., replacement) is shown in FIG. 5. In this example, the code patching services are provided in the transparent mode of operation in that the application 102 is unaware of the DELI's presence, i.e., the application code was not written to utilize the DELI 100. Beginning with block 500, the DELI 100 is initiated and, as indicated in block 502, injected into the application 102 before it starts so as to gain control over its execution. With this control, the DELI 100 can intercept the various application instructions that are to be executed, as indicated in block 504.

As in the mode of operation described in relation to FIG. 4, the DELI 100 monitors the execution of code so it can be determined which code fragments to cache. Accordingly, as described above, the DELI 100 can determine whether an associated code fragment has previously been cached, as indicated in decision element 506. If so, the DELI 100 jumps to the code cache(s) 124 that contains the code and this code is executed by the hardware 104 in lieu of the original application code, as indicated in block 508. Again, execution of the cached code continues until a reference to code that has not been cached is encountered (510), e.g., a cache miss occurs, at which time the DELI 100 jumps back to the application code and block 504.

With reference back to decision element 506, if no associated code fragment resides in the code cache(s) 124, flow continues to block 512 at which the fragment (one or more application instructions) is copied, for instance to one or more instruction buffers. Next, with reference to decision element 514, the DELI 100 determines whether the application fragment comprises code that is to be replaced. This determination can be made with reference to a patch table that is maintained by the DELI core 106. The patch table contains a patch descriptor for each type of patch request. Typically, each patch descriptor comprises an identifier of the application code to be replaced and a piece of code that will replace the application code.

If the fragment is not to be replaced, for instance is free of bugs, flow continues to block 518 described below. If, on the other hand, the fragment includes code that is to be replaced, flow continues to block 516 at which the application code is replaced with replacement code, i.e., one or more instructions that provide the desired function. By way of example, this replacement code is stored within computing system memory 304 beyond the DELI 100 so that it cannot be accidentally deleted during DELI operation. The correct replacement code can be fetched from the storage location by the DELI 100 with reference to an appropriate identifier (e.g., tag) contained in the descriptor of the patch. The replacement of the original code also entails changing all references to that code such that these references will in the future direct execution to the replacement code (instructions). In most cases, the DELI 100 will intercept all branches to entry points of the replaced code (function) and replace them with branches to the new code. The DELI 100 can easily scan for direct branches to the function entry point by inspecting the target address of each branch instruction. As for indirect branches, the DELI 100, at the time of uploading the patch, can inspect this table and remove all targets that fall into the old address range. When the DELI 100 attempts to branch indirectly to an address that is not in this table, it returns to its emulator, and then emulates the call to the patched routine, executing the new code.

Flow continues to block 518 at which code fragments, both copies of original program instructions that were not replaced and applicable replacement instructions, are cached for later execution at block 508 described above. As mentioned above, such operation may result in substantially all code being ultimately stored and executed within the code cache(s) 124. In such a case, substantially all of the original application instructions may eventually be placed in the code cache(s) 124. As will be appreciated by persons having ordinary skill in the art, once this occurs, the overhead associated with copying and caching code is removed. Operating in this manner, existing software code can be replaced without the need to interrupt operation of the application. Accordingly, the software can be modified while running without the need to recompile, relink, or restart an image.

As will be appreciated by persons having ordinary skill in the art, transition code may be necessary where the original application code that is to be replaced is currently running, i.e., has an active frame on the runtime stack. Notably, however, such transition code may not be necessary if the original application code is replaced under certain conditions. In particular, transition code typically is not necessary where the code (i.e., function) to be replaced with the patch has the granularity of a complete function and the new code has the same interface, no changes are to be made to global data structures, no inlined copies of the original code exist, the code to be replaced is not currently running (i.e., there is no active invocations frame on the runtime stack), the code to be replaced represents a contiguous sequence of instructions in the image (i.e., a loaded binary), and the code routine(s) to be placed has/have one or more distinct entry points that are known locations and that are the only places that execution transfers from outside to inside the routine (to allow intercepting transfer into the function by setting break points at all function entry points). Notably, the requirement for a contiguous sequence of instructions can be relaxed if appropriate mapping mechanisms have been introduced.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although the DELI has been described above with reference to FIG. 5 as primarily providing dynamic code patching, it is to be noted that various other services can simultaneously be provided by the DELI. For instance, the dynamic code patching services provided by the DELI can be utilized when performing other tasks including, for instance, instruction optimization, etc. The present disclosure is intended to include such hybrid operation.

What is claimed is:

1. A method for dynamically patching code, comprising the steps of:
   intercepting original program instructions during execution of the program;
   determining if an original program instruction is to be replaced; and
   dynamically replacing the original program instruction with a replacement instruction by fetching the replacement instruction and storing the replacement instruction in a code cache from which the replacement instruction can be executed in lieu of the original program instruction.

2. The method of claim 1, wherein dynamically replacing the original program instruction further comprises executing the replacement instruction in lieu of the original program instruction each time a function associated with the original program instruction is required.

3. The method of claim 1, wherein the replacement instruction comprises part of a patch that is made available via an application programming interface.

4. The method of claim 1, further comprising prior to determining if an original program instruction is to be replaced, determining if the original program instruction has been cached.

5. The method of claim 4, further comprising executing the cached instruction in lieu of the original program instruction if an associated instruction has been cached.

6. The method of claim 1, further comprising prior to intercepting program instructions, gaining control over execution of original program instructions by injecting a software interface into the program.

7. The method of claim 1, further comprising dynamically receiving information about original program instructions to be replaced and replacement instructions to replace the original program instructions.

8. The method of claim 1, further comprising executing transition code if an original program instruction to be replaced is currently running.

9. A system for dynamically patching code, comprising:
   means for gaining control over execution of a program;
   means for intercepting original program instructions during execution of the program;
   means for determining if an original program instruction is to be replaced with a new instruction; and
   means for dynamically replacing the original program instruction with a replacement instruction, the means for dynamically replacing being configured to fetch the replacement instruction and store the replacement instruction in a code cache from which the replacement instruction can be executed in lieu of the original program instruction.

10. The system of claim 9, further comprising means for determining if an original program instruction has been cached.

11. The system of claim 9, further comprising means for dynamically receiving information about original program instructions to be replaced and replacement instructions that are configured to replace the original program instructions.

12. A dynamic patching program stored on a computer-readable medium, the program comprising:
   logic configured to gain control over execution of a program;
   logic configured to intercept original program instructions during program execution;
   logic configured to determine if an original program instruction is to be replaced; and
   logic configured to dynamically replace the program instruction with a replacement instruction by fetching the replacement instruction and storing the replacement instruction in a code cache from which the replacement instruction can be executed in lieu of the original program instruction.

13. The program of claim 12, further comprising logic configured to determine if an original program instruction has been cached.

14. The program of claim 12, further comprising logic configured to dynamically receive information about original program instructions to be replaced and replacement instructions that are configured to replace the original program instructions.

15. A method for dynamically patching code, comprising:

gaining control over the execution of a program using a software interface;

intercepting original program instructions during execution of the program;

determining whether the original program instructions have been cached in a code cache of the software interface and, if so, executing the cached instructions;

if the original program instructions have not been cached, determining if the original program instructions are to be replaced;

dynamically replacing the original program instructions with replacement instructions if it is determined that the original program instructions are to be replaced by fetching the replacement instructions and storing the replacement instructions in the code cache of the software interface; and executing the replacement instructions from the code cache of the software interface in lieu of the original program instructions.

16. The method of claim 15, further comprising executing the replacement instructions in lieu of the program instructions each time a functionality associated with the original program instructions is required.

17. The method of claim 16, wherein the replacement instructions comprise part of a patch that is made available via an application programming interface.

18. The method of claim 15, further comprising executing transition code if an original program instruction to be replaced is currently running.

* * * * *

UNITED STATES PATENT AND TRADEMARK OFFICE
CERTIFICATE OF CORRECTION

PATENT NO. : 6,915,513 B2 Page 1 of 1
APPLICATION NO. : 09/997062
DATED : July 5, 2005
INVENTOR(S) : Evelyn Duesterwald et al.

It is certified that error appears in the above-identified patent and that said Letters Patent is hereby corrected as shown below:

In column 5, line 34, delete "did," and insert -- dld, --, therefor.

In column 5, line 45, delete "1110" and insert -- 110 --, therefor.

In column 14, line 7, in Claim 4, delete "comprising" and insert -- comprising, --, therefor.

In column 14, line 14, in Claim 6, delete "comprising" and insert -- comprising, --, therefor.

Signed and Sealed this

Twenty-eighth Day of July, 2009

JOHN DOLL
*Acting Director of the United States Patent and Trademark Office*